Nov. 24, 1942.  R. A. WEAGANT  2,302,902
DIRECTIONAL RECEIVING SYSTEM
Filed July 13, 1940  2 Sheets—Sheet 2
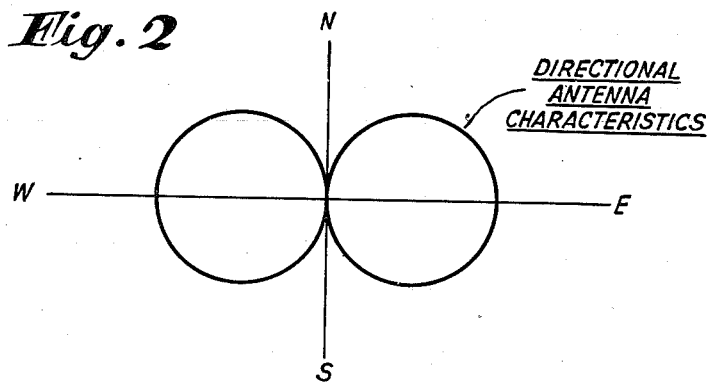
*Fig. 2* — DIRECTIONAL ANTENNA CHARACTERISTICS
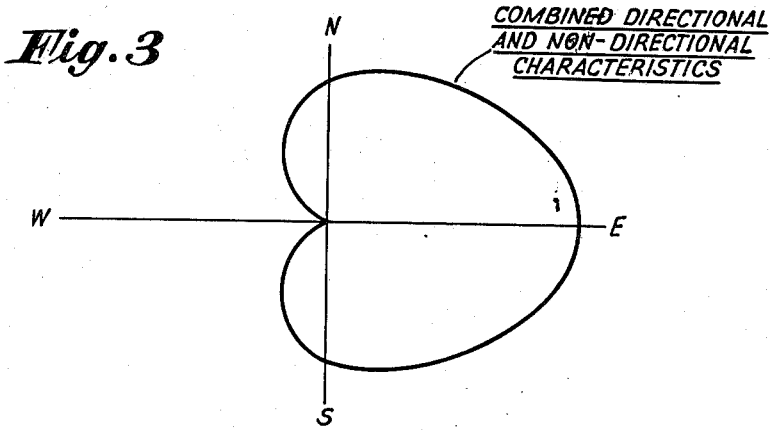
*Fig. 3* — COMBINED DIRECTIONAL AND NON-DIRECTIONAL CHARACTERISTICS
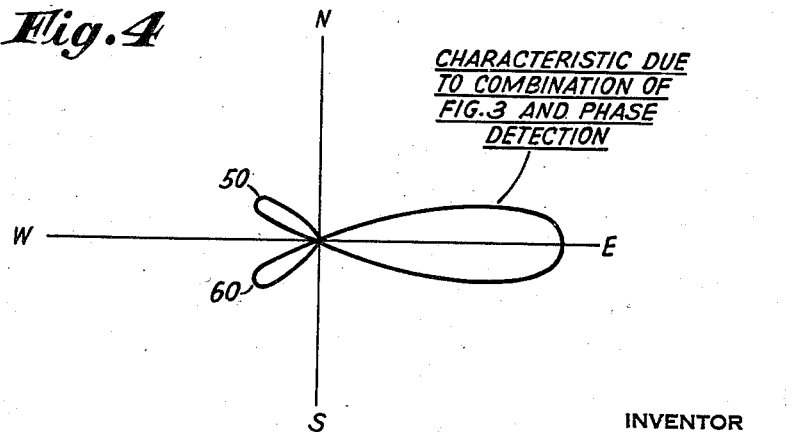
*Fig. 4* — CHARACTERISTIC DUE TO COMBINATION OF FIG. 3 AND PHASE DETECTION
INVENTOR
ROY A. WEAGANT
BY
ATTORNEY Patented Nov. 24, 1942

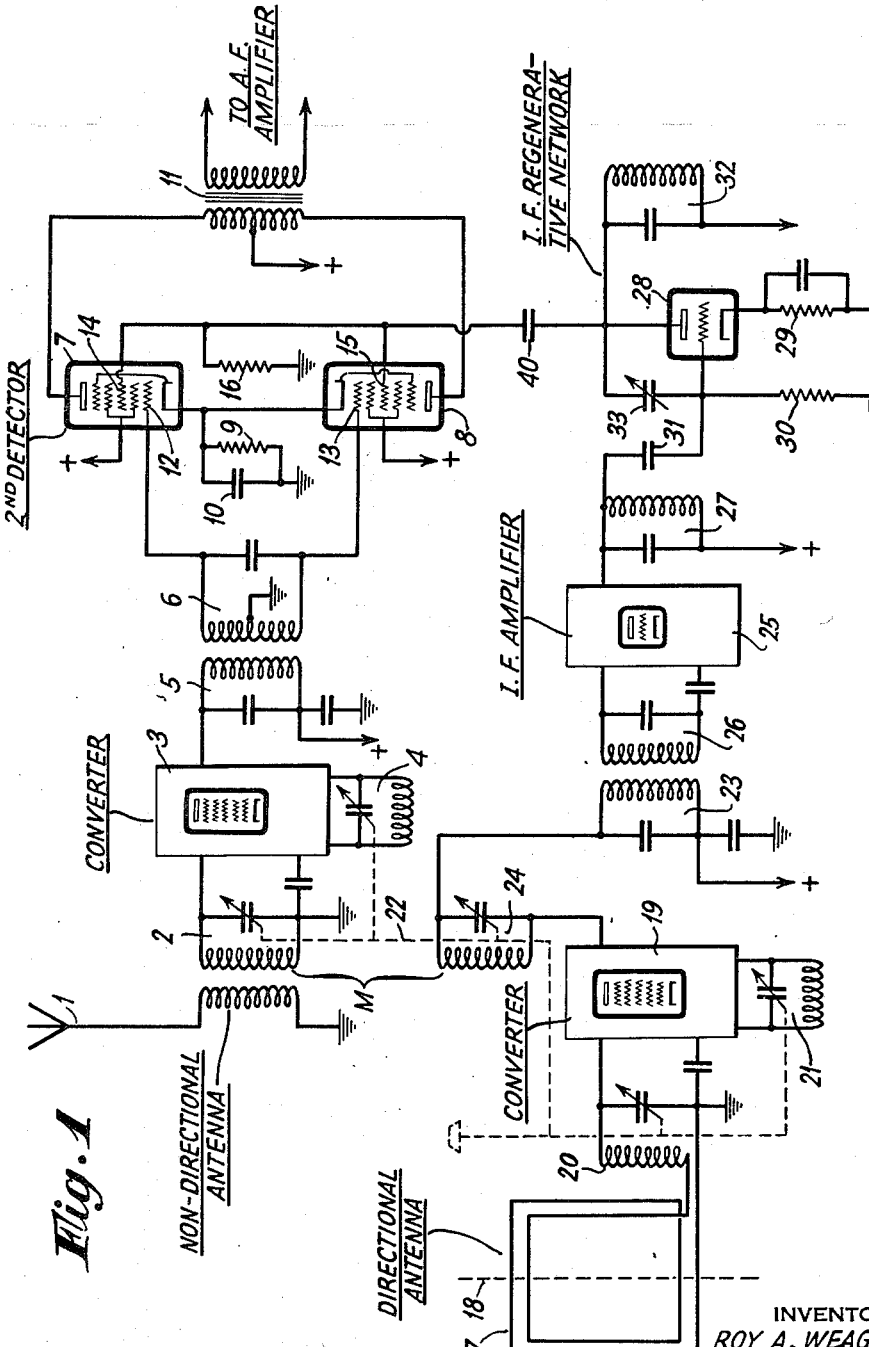

2,302,902

UNITED STATES PATENT OFFICE 2,302,902

DIRECTIONAL RECEIVING SYSTEM

Roy A. Weagant, Douglaston, N. Y., assignor to Radio Corporation of America, a corporation of Delaware Application July 13, 1940, Serial No. 345,274

3 Claims. (Cl. 250—11)

My present invention relates to directional signal receiving systems, and more particularly to a radio receiving system constructed to have substantially zero responses in more than two quadrants.

There are many situations in signal reception wherein it is desired to have substantially zero response in more than two quadrants of orientation of the signal collector device. For example, interference from adjacent channels may be effectively reduced by proper orientation of the signal collector, where the desired signals and undesired signals originate from spaced points. Again, static disturbances, whether atmospheric or man-made, may be considerably minimized by proper orientation of the collector, since such disturbances are directional. In direction finding it is not only highly advantageous to employ a receiving system of a plurality of zero responses in as many quadrants, but it is desirable to have an orientation pattern for the collector which displays a fairly rapid change of slope between a point of maximum response and an adjacent zero response point.

It may be stated, therefore, to be one of the main objects of my present invention to provide a directional signal receiver system whose signal collection response characteristic possesses more than two substantially zero response quadrants.

It is another important object of my invention to provide a radio receiver having an orientatable collector device, and the receiver signal collection response pattern exhibiting three null points spaced substantially in quadrature relation.

Another object of my invention is to provide a radio receiving system comprising a pair of transmission channels; one of the channels having a non-directional signal pick-up device, the other channel having a directional signal pick-up device, and the outputs of both channels being combined in such a manner that the resulting response characteristic of the system possesses more than two null points in quadrature relation.

Still other objects of the invention are to improve directive signal response systems, and more especially to provide a radio receiver having a directional signal pick-up device which functions to improve selectivity and reduce response to static disturbances.

The novel features which I believe to be characteristic of my invention are set forth in particularity in the appended claims; the invention itself, however, as to both its organization and method of operation will best be understood by reference to the following description taken in connection with the drawings in which I have indicated diagrammatically a circuit organization whereby my invention may be carried into effect.

In the drawings:

Fig. 1 shows a receiving system embodying the invention,

Fig. 2 illustrates the loop antenna characteristic,

Fig. 3 shows the combined pattern of both antennae,

Fig. 4 illustrates the response pattern secured by my invention.

Referring now to the accompanying drawings, there is shown in Fig. 1 a receiving system which is generally of the superheterodyne type. From a generic viewpoint the receiving system employs a pair of parallel signal transmission channels which feed the second detector stage. One of the channels comprises a non-directional signal pick-up device, and the signals collected thereby are transmitted to the second detector in the form of intermediate frequency (I. F.) energy. The other transmission channel comprises a directional signal pick-up device which produces I. F. energy whose major audio frequency modulation components are removed, and the I. F. energy is combined with the I. F. energy of the first channel at said second detector. The resulting response is the product of the two response patterns shown in Figs. 2 and 3. More specifically, the first signal transmission network comprises a non-directive grounded antenna circuit 1 which is coupled to the tunable input signal circuit 2 of the converter stage 3. The converter may be a combined local oscillator-first detector network utilizing, if desired, a pentagrid converter tube of the 6A7 type. In such case the numeral 4 denotes the oscillator tank circuit which is simultaneously tunable with the signal circuit 2.

Of course, the converter tube may utilize a separate local oscillator tube. However, in any case, the tank circuit 4 is to be understood as adjustable in frequency through a range of frequencies which constantly differs from the signal frequency range by the value of the I. F. For example, if the signal frequency range is the standard broadcast range of 550–1700 kilocycles (kc.), then the local oscillator frequency range may be such as to yield an I. F. value which may be chosen from 75 to 456 kc. It is preferable to apply the signals to the first grid of the converter tube and the local oscillations to the third grid, although it will be understood that the invention is in no way dependent upon such details. The numeral 5 denotes the resonant output circuit of the converter stage, and the circuit 5 is fixedly tuned to the operating I. F. value.

The I. F. output circuit 5 is magnetically coupled to the resonant input circuit 6 of the second detector network. The circuit 6 is fixedly tuned to the operating I. F. value, and the midpoint of the coil thereof is established at ground potential. The second detector network comprises a pair of tubes 7 and 8, and each of these tubes may be of the pentagrid type. The cathodes of the tubes are connected to ground through a common grid bias resistor 9 which is appropriately by-passed for I. F. currents by condenser 10. The plates of the tubes are connected in push-pull relation to the opposite ends of the primary winding of the audio output transformer 11, the mid-point of the winding being connected to a source of positive potential. The secondary winding of the transformer 11 is connected to one or more audio frequency amplifiers, and any desired type of reproducer will follow the final audio amplifier.

The first, or signal input, grid 12 of tube 7 is connected to one side of the input circuit 6, while the similar grid 13 of tube 8 is connected to the opposite side of input circuit 6. The third grid 14 of tube 7 is connected to the similar third grid 15 of tube 8. A grid leak resistor 16 connects both grids 14 and 15 to ground whereby both grids are established at a negative bias by the voltage drop across resistor 9. Each of the grids 14 and 15 is surrounded by a positive screening field. There is impressed upon each of grids 14 and 15 I. F. energy which is derived from the second channel of the receiving system. The I. F. energies impressed on the respective first and third grids of each of the tubes are in phase in one tube and in opposite phase in the other tube. The significance of this relation will be brought out in further detail at a later point.

The second transmission channel comprises the directional antenna 17, and the latter may be a rotatable loop antenna of any well known construction. The dotted vertical line 18 denotes the axis about which the loop antenna is rotated. Signals picked up by loop 17 are fed to a converter 19 whose construction is preferably similar to that of the converter 3. The loop 17 is part of the signal input circuit of converter 19, and such input circuit, additionally, includes the series coil 20 as well as the adjustable tuning instrumentality. The numeral 21 denotes the tunable oscillator tank circuit which is similar in construction to the tank circuit 4. The dotted lines 22 denote the mechanical uni-control device which may be employed to vary the various tuning elements of each of signal circuits 2 and 17, as well as tank circuits 4 and 21.

Those skilled in the art are fully acquainted with the construction of such tuning devices, and by way of illustration in the present application these tuning devices have been shown as variable condensers. In such case the mechanism 22 would vary the positions of the rotors of these variable condensers. In the ouput circuit of the converter 19 there is disposed in series with the I. F. output circuit 23 a resonant network 24 which is variably tuned over the same signal frequency range as circuits 2 and 17 are tuned. In other words, in the output circuit of converter 19 there is arranged a pair of resonant circuits one of which is tuned to the operating I. F. value while the other circuit is tuned to the signal frequency prior to heterodyning. Of course, the operating I. F. value of circuit 23 is the same as that of circuit 5. The variable condenser tuning device of circuit 24 has its rotor arranged for adjustment by the control device 22.

In order to provide proper operating conditions in the second detector network, the I. F. voltage developed across circuit 23 is transmitted through an I. F. amplifier 25. The latter is provided with an I. F. input circuit 26, coupled to circuit 23, and an I. F. output circuit 27. The signal voltage across circuit 24 is impressed upon the signal input circuit 2 of converter stage 3 by virtue of any desired type of reactive coupling between circuits 24 and 2. By way of illustration the reactive coupling is shown as a mutual inductance M. Subsequent to I. F. amplification the I. F. voltage developed across circuit 27 is impressed upon the signal input electrode of a tube 28.

The tube 28 has its cathode connected to ground through a self-biasing resistor network 29, while the signal input grid is connected by grid leak 30 to ground. The direct current blocking condenser 31 connects the signal grid of tube 28 to the high potential side of circuit 27, and numeral 32 denotes a resonant circuit which is fixedly tuned to the operating I. F. value and which is in the plate circuit of tube 28. The feedback condenser 33 provides regenerative feedback between the plate circuit and grid circuit of tube 28, and the condenser 33 is adjusted to that value which will provide highly amplified I. F. energy. Preferably the tube 28 is adjusted in its feedback so that it is close to oscillation. That is to say, a high degree of regeneration is provided with the result that substantially all the modulation components are stripped from the I. F. carrier. In other words, the regenerative circuit of tube 28 acts as a highly selective filter which passes substantially the I. F. carrier and rejects the modulation side band components; this action is well known in the art. Either all the modulation components are removed, or a few hundred cycles of the lower audio frequencies are removed. By utilizing a regenerative tube arrangement for stripping the modulation components from the I. F. carrier, there is produced a highly ampified I. F. carrier energy. From another viewpoint, the network embodying tube 28 provides an exalted, or augmented, unmodulated I. F. carrier voltage.

This exalted I. F. carrier voltage is injected into the tube 7 and tube 8 by coupling the plate of tube 28 to each of grids 15 and 14 through the condenser 40. Hence, it will be seen that in each of the detector tubes the first grid has applied thereto fully modulated I. F. carrier voltage, while the third grid has impressed upon it exalted I. F. carrier voltage which has had stripped therefrom substantially all the modulation components. It has been previously observed that the voltages applied to the first and third grids of each of the detector tubes are the same phase in one tube and in opposite phases in the other. It can be demonstrated that in the common output circuit of tubes 7 and 8 there will, therefore, be produced audio voltage which is the product of the exalted carrier and the modulated signal carrier in each of the tubes. Reference is made to my application Serial No.

234,983 filed October 14, 1938, Patent No. 2,243,-140, dated May 27, 1941, for a detailed explanation of this phase detection action. In order to render the second detector network, which is a phase detection network, effective it is highly desirable that the ratio of the exalted I. F. carrier voltage to the modulaed I. F. carrier voltage be very greatly in favor of the former. In other words, for best operating results the signal voltage at the input circuit 6 should be relatively small in magnitude compared to the exalted I. F. carrier voltage fed through coupling condenser 40 to the grids 14 and 15. In general, the advantages of operating with these relationships have been pointed out in my application Serial No. 335,892 filed May 18, 1940, Patent No. 2,243,141, dated May 27, 1941, entitled "Radio receiver circuits."

To secure the pattern of Fig. 4 the detector should have a square law of detection. The exalted carrier must not go beyond the limits of the square law portion of the detection characteristic. The audio output is proportional to the product of the exalted carrier and the signal carrier. The directional characteristic of the input to tube 7 and tube 8 is a cardioid of Fig. 3, while the directional characteristic of the exalted carrier is that shown in Fig. 2. These two characteristics when multiplied together produce the pattern of Fig. 4.

In order fully to explain the advantages to be secured with the present invention, it is first pointed out that those skilled in the art are fully aware of the fact that the response pattern of the non-directional antenna 1 is a circle. Fig. 2 shows the directional pattern of a loop antenna, and it will be observed that this is the well known figure of eight pattern. In other words, the second transmission channel by itself possesses a figure of eight response pattern. Fig. 3 shows the cardioid pattern which is secured by virtue of the reactive coupling M between signal circuit 24 and the input circuit 2 of converter 3. From another viewpoint the significance of the pattern shown in Fig. 3 resides in the fact that if a conventional detector were coupled to circuit 5, the signal response would follow the cardioid pattern of Fig. 3 as the loop 17 were orientated throughout the 360 degrees of the compass.

However, since there is applied to the phase detection network signal voltage which follows the cardioid pattern of Fig. 3, the effect of the exalted I. F. carrier voltages applied to grids 14 and 15 is to cause the response in the output circuit of tubes 7 and 8 to follow the pattern shown in Fig. 4. As will be seen from the latter figure, this pattern has null points in the north, south and west directions; that is to say, the pattern has three null points in quadrature relation. Furthermore, the rate of change of the signal response between a point of maximum response and a null point is very rapid. It will, also, be observed that the pattern of Fig. 4 exhibits a relatively large lobe in the easterly direction, while the lobes 50 and 60 are substantially smaller, and in each case are located midway in the northwest quadrant and in the southwest quadrant.

The advantages of a response pattern as that shown in Fig. 4 are many. As will be noted there are three zero directions and the total area of this curve compared to a circumscribing circle indicates the improvement over an ordinary vertical antenna, on the assumption that signals may arrive from all directions. If it is assumed that only one station exists at a particular wave length and that the loop antenna 17 is rotated, then the response for following directions will be as indicated in Fig. 4.

It is in the matter of static reduction that this arrangement has its maximum significance. In phase detection when static is present two distinct actions take place. First, there is an interaction between the accentuated I. F. signal carrier and the static energy in the signal input circuit 6. There is also an action which takes place between the static that comes in on the accentuated I. F. carrier circuit and the static in the signal input circuit 6. This action becomes progressively more important as the static increases in intensity. With the arrangement described herein this particular static action will follow the curve of Fig. 4, assuming that even distribution of static exists in all directions. Static is usually quite directional and therefore in actual practice it may be expected that when it is particularly heavy the loop 17 may be turned in such a direction that one of the zero points of curve 4 will correspond with the directional arrival of the static disturbances. It is to be understood that by "static disturbances" is meant both nature and man-made static.

The present invention is of especial value in direction finding. Usually loop observations are made around the zero point, because they are more sharply defined at this point. There are, however, two conditions under which this type of observation becomes difficult. That is, when the signal is very weak and when static happens to be arriving in a direction at right angles to the signal direction. The pattern of Fig. 4 changes much more rapidly in the region of its maximum than does the ordinary loop curve such as shown in Fig. 2. Hence, directional observations can be made at the point of maximum signal strength, while static at right angles to the signal direction can be at a minimum. Under these circumstances, it will have the additional advantage of cutting out any interference or static from the opposite quadrants.

The present arrangement is also suitable for improving the reduction of interference produced by interfering signals on the same or other channels. The pattern of Fig. 4 applies to this type of interference, and will apply to the detection which takes place between the carrier and side bands of an interfering signal. However, in the case of signal interference on the same channel as the desired signal frequency, a very large improvement in such interference reduction can be had with this system, and in many cases it will be possible to adjust one of the zero points of the pattern of Fig. 4 toward the interfering signal while admitting some of the desired signal frequency from another direction.

The expression "phase detection" is employed in this application to signify detection obtained with balanced detector tubes having a differential output circuit, and having equal modulated carrier signals applied thereto so that all normal detection is suppressed. It is only by the injection of the properly phased unmodulated oscillations, of a frequency equal to the modulated carrier frequency, that an audio output is secured. The proper phasing of the injected oscillations is such that the modulated and unmodulated waves are in phase in one detector tube, whereas they are in opposite phase in the other tube.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In a signal receiving system, in combination, at least two signal transmission channels, one of said channels being provided with a non-directional signal pick-up device, and the other channel being provided with a directional signal pick-up device, means for impressing signal voltage from the second channel upon said first channel, means in the second channel for deriving from signal voltage therein an exalted unmodulated alternating voltage of said signal frequency, and a phase detection network for combining said exalted voltage and the signal voltage transmitted through said first channel.

2. In a radio receiving system, a non-directive signal collector, means for reducing collected signal energy to an intermediate frequency, a directional antenna device, means for reducing the signal energy collected by the directional antenna to said intermediate frequency, means combining with signal energy collected by said non-directional collector device signal energy collected by said directional antenna device, a phase detection network, means for deriving from the second intermediate frequency energy an exalted intermediate frequency carrier voltage, and means combining in said phase detection network said first intermediate frequency energy and said exalted carrier voltage.

3. In a radio receiving system, a non-directive antenna, means for reducing collected signal energy to an intermediate frequency, a directional antenna, means for reducing the signal energy collected by the directional antenna to said intermediate frequency, means combining with signal energy collected by said non-directional antenna signal energy collected by said directional antenna, a phase detection network, means for deriving from the second intermediate frequency energy exalted unmodulated intermediate frequency carrier voltage, and means combining in said phase detection network said first intermediate frequency energy and said exalted voltage.

ROY A. WEAGANT.